United States Patent
Yokokawa (10) Patent No.: US 7,260,676 B2
(45) Date of Patent: Aug. 21, 2007

(54) OPTICAL DISC RECORDING/REPRODUCING METHOD AND RECORDING/REPRODUCING APPARATUS

(75) Inventor: Tsuyoshi Yokokawa, Toyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 353 days.

(21) Appl. No.: 10/486,988

(22) PCT Filed: Sep. 11, 2002

(86) PCT No.: PCT/JP02/09305

§ 371 (c)(1),
(2), (4) Date: Feb. 18, 2004

(87) PCT Pub. No.: WO03/025931

PCT Pub. Date: Mar. 27, 2003

(65) Prior Publication Data

US 2004/0213107 A1   Oct. 28, 2004

(30) Foreign Application Priority Data

Sep. 14, 2001   (JP) .............................. 2001-278951

(51) Int. Cl.
G06F 12/00   (2006.01)

(52) U.S. Cl. .................... 711/112; 369/47.55

(58) Field of Classification Search ............. 369/30.02, 369/30.04, 30.25, 47.41, 47.47, 47.55; 711/111, 711/112

See application file for complete search history.

(56) References Cited

U.S. PATENT DOCUMENTS

| | | | | | |
|---|---|---|---|---|---|
| 5,745,458 | A | * | 4/1998 | Oliver et al. | 369/53.28 |
| 6,463,022 | B1 | * | 10/2002 | Ito et al. | 369/53.24 |
| 6,496,913 | B1 | * | 12/2002 | Taugher et al. | 711/170 |

FOREIGN PATENT DOCUMENTS

| | | |
|---|---|---|
| JP | 8-161751 | 6/1996 |
| JP | 9-312086 | 12/1997 |
| JP | 10-40666 | 2/1998 |

* cited by examiner

*Primary Examiner*—Woo H. Choi
(74) *Attorney, Agent, or Firm*—Steptoe & Johnson LLP (57) ABSTRACT

An object of the present invention is to reduce the time a host computer requires to recognize a recordable disc such as CD-R/CD-RW. The method includes the steps of determining whether or not an optical disc loaded in the optical disc recording/reproduction apparatus is an optical disc onto which data is likely to be written (S46), and if the preceding step S46 determines the loaded disc as an optical disc onto which data is likely to be written, acquisition of disc information required for recording on the optical disc is performed by the host computer inter-relatedly with a spinup in the same step (S47). Thus, the optical disc recording/reproducing apparatus returns the disc information to the host computer in step (S4E) without performing the step (S4D) for acquiring the disc information after the completion of the spinup (S4A) for the optical disc onto which data is likely to be written. Thus, the time required for recognizing a recordable disc can be reduced when the disc is loaded.

6 Claims, 8 Drawing Sheets

FIG. 8

OPTICAL DISC RECORDING/REPRODUCING METHOD AND RECORDING/REPRODUCING APPARATUS

TECHNICAL FIELD

The present invention relates to an optical disc recording/reproducing method for an optical disc recording/reproducing apparatus connected to a host computer for recording and reproducing data according to instructions from the host computer through the use of writing software.

BACKGROUND ART

In typical CD-R drives or CD-RW drives, which are write-once or rewritable optical disc drives, a command for returning information about the recognition of a recordable optical disc to a host computer is a read disc information command or a read track information command. Information concerning recording must be acquired before the response to this command.

Determination of completion of disc recognition depends on the environment of the host computer. In particular, in a host computer environment in which the priority of reproduction from a loaded optical disc is higher, the return of information about the file system of a recorded area after the completion of spinup is typically considered as the completion of disc recognition. In a host computer environment in which the priority of recording onto a loaded optical disc is higher, the return of information concerning recording in response to the read disc information command or read track information command mentioned above is typically considered as the completion of disc recognition.

However, the differences in disc recognition conditions among host computer environments or the reduction in disc recognition time are not sufficiently considered in prior-art CD-R or CD-RW drives. The timing of acquiring disc information concerning recording after a recordable disc is loaded is fixed in a spinup period or fixed in a period between the completion of spinup and the response to a read disc information command or read track information command.

Furthermore, in the case of acquiring information needed for reproduction operation during spinup and acquiring information needed for write operation, the acquisition of all Table of Contents (hereinafter abbreviated to TOC) information and address translation information, which are required for reproduction, is performed separately from the acquisition of track record format information, which is recorded area track record information concerning recording, and the acquisition of track write position information.

Moreover, the count of error retries for acquiring the information concerning recording within a spinup period is set to considerably large value without making a distinction from the error retry count for acquiring information required for reproduction. Consequently, a timeout error due to failure to acquire information concerning recording occurs frequently during the spinup period.

Furthermore, track record information in a program memory area (hereinafter abbreviated to PMA) is also used for acquiring all TOC information on a multi-session disc. Therefore when a CD-R/RW disc is loaded, the track record information in the PMA is acquired during the spinup.

Furthermore, Constant Linear Velocity (CLV) mode is used for the acquisition of information concerning recording and reproduction, which involves access to an inner area and an outer edge of an optical disc.

In prior-art CD-R/CD-RW drives, the timing of acquiring disc information concerning recording after a recordable optical disc is loaded is fixed in a spinup period or fixed in a period between the completion of spinup and the response to a read disc information command or read track information command. Accordingly, it can take much time to recognize a loaded recordable optical disc, depending on host environments.

Furthermore, the acquisition of track record information about a recorded area and a write position, which is information concerning recording, and the acquisition of information required for reproduction are separately performed during a spinup. Therefore, seeks in long ranges and in the reverse direction frequently occur in an optical disc, leading to increased processing time.

In addition, when the acquisition of information concerning recording is performed within a spinup period, a timeout error can occur during the spinup period because the number of error retries for acquiring information concerning recording is set to a large number.

Furthermore, the acquisition of information in the PMA that is used for acquiring all TOC information on any multi-session CD-R/CD-RW disc increases spinup time.

Furthermore, CLV mode, which involves access to an inner and outer area of an optical disc is used for acquiring information required for recording and reproduction. As a result, acceleration and reduction of the speed of the spindle motor frequently occur, slowing the acquisition.

DISCLOSURE OF INVENTION

Therefore, an object of the present invention is to reduce the time required for a host computer to recognize a disc in an optical disc recording/reproducing apparatus that performs recording and reproduction according to instructions from the host computer.

An optical disc recording/reproducing method of the present invention that solves the above described problem is characterized in that: if a loaded optical disc has a recording state that provides a high possibility of recording or uses a recording type having a high possibility of recording and therefore the disc is considered as an optical disc that is likely to be recorded, or if it is determined that a command for acquiring information concerning recording is issued from a host computer in an early stage after the completion of a spinup and the host computer environment is identified as one in which the priority of recording on a loaded disc is high and disc information concerning recording should be acquired for the recognition of the disc, then acquisition of track record information and write position information that are required for recording are performed in conjunction with the acquisition of information required for reproduction during the spinup, thereby reducing the time required for the host computer to recognize the disc.

That is, on the ground that to acquire information in a close range or in the opposite direction is short in terms of time and stable in terms of operation compared with in a long range or in the same direction, a seek is performed in a close range and in a fixed direction so that the acquisition of all TOC information and address translation information required for reproduction and the acquisition of track record information for a recorded area and write position information, which are information concerning recording, are performed in conjunction with each other in the same process, thereby reducing the seek time.

In addition, disc recognition timing setting changing means is proposed herein in order to accommodate a change of the timing of issuing a command for acquiring information concerning recording due to an update of a device driver or writing software on the host computer.

Furthermore, the number of error retries for acquiring information concerning recording within a spinup is reduced and, if an error occurs, the acquisition of information is suspended and the remaining spinup is continued and the information concerning recording is acquired within a period between the completion of the spinup and the provision of the response to a command returning the information concerning recording, thereby decreasing the provability of timeout errors due to failure to acquire information concerning recording during the spinup.

If a CD-R/CD-RW disc is loaded and it is determined from its first-session TOC information acquired previously that its second session is void, then the acquisition of information in a program memory area (PMA) in the disc and the remaining information concerning recording are not performed in the spinup to reduce the spinup time.

Furthermore, for the acquisition operation of information required for recording and reproduction that involves access to inner and outer areas of an optical disc, Constant Angular Velocity (CAV) mode is used in which acceleration or reduction of the speed of the spindle motor does not take place, thereby reducing the time required for the host computer to recognize the disc.

In optical disc recording/reproducing apparatuses, it is commonplace that TOC information and address translation information for regenerative areas are acquired during a spinup period as information required for reproduction. It is proposed herein that if a loaded optical disc has a recording state that provides a high possibility of recording or uses a recording type having a high possibility of recording and therefore the disc is considered as an optical disc that is likely to be recorded, or if it is determined that the host computer environment is one in which a command for acquiring information concerning recording is issued from a host computer in an early stage after the completion of a spinup, the acquisition of track record information and write position information required for recording are performed in conjunction with the acquisition of information required for reproduction in the same process during the spinup to reduce the time required for the host computer to recognize the disc. Furthermore, disc recognition timing setting change according to changes in the host computer environment is proposed.

This means that on the ground that to acquire information in a close range or in the opposite direction is short in terms of time and stable in terms of operation compared with in a long range or in the same direction, a seek is performed in a range and in a fixed direction where possible so that the acquisition of all TOC information and address translation information required for reproduction and the acquisition of track record information for a recorded area and write position information, which are information concerning recording, are performed in conjunction with each other in the same process, thereby reducing the seek time.

It is common that the value of timeout that occurs if a spinup does not end within a predetermined time is set to protect the optical disc recording/reproducing apparatus against loading of an invalid disc, and if a timeout error occurs, a Not Ready state is returned to the host computer. It is not advantageous to an optical disc recording/reproducing apparatus having reproduction capability that the a timeout error is caused due to an excess amount of time required for acquiring information concerning recording unrelated to reproduction. Therefore, the number of error retries for acquiring information concerning recording during a spinup is decreased and, if an error occurs, the acquisition of the information is suspended, the remaining spinup is continued, and then the acquisition of the information concerning recording is performed before the response to a command returning the information concerning recording, thereby decreasing the provability of occurrence of timeout errors due to failure of acquiring information concerning recording during a spinup.

Furthermore, for acquiring track record information recorded in an extended recording area (PMA) in the optical disc, which is record information useful for writing data and also used for acquiring all TOC information in the multisession disc, it is determined on the basis of first-session TOC information whether or not the second session is effective. If it is determined that the second session is void, then the acquisition of information in the PMA and other information concerning recording are not performed during the spinup to reduce the spinup time.

Moreover, for acquiring information concerning recording that involves access to an inner area and outer area of the optical disc, CAV mode is used in which acceleration or reduction of the speed of the spindle motor does not take place, thereby reducing the time required for the host computer to recognize the optical disc.

An optical disc recording/reproducing method set forth in claim 1 of the present invention is characterized in that: for using writing software to perform recording and reproduction in an optical disc recording/reproducing apparatus connected to a host computer according to instructions from the host computer, the method comprises the steps of: determining whether or not an optical disc loaded in the optical disc recording/reproduction apparatus is an optical disc onto which data is likely to be written; and if it is determined in the preceding step that the disc is an optical disc onto which data is likely to be written, acquisition of disc information required for recording onto the optical disc is performed by the host computer during a spinup; wherein the optical disc recording/reproducing apparatus returns the disc information to the host computer without performing the acquisition of the disc information after the completion of the spinup for the optical disc onto which data is likely to be written.

This configuration can reduce the time required for the host computer to recognize a loaded recordable optical disc.

An optical disc recording/reproducing method set forth in claim 2 of the present invention is characterized in that: for using writing software to perform recording and reproduction in an optical disc recording/reproducing apparatus connected to a host computer according to instructions from the host computer, comprising the steps of: determining whether or not a command for the optical disc recording/reproducing apparatus to return information concerning recording to the host computer has been issued by the host computer in an early stage after the completion of a spinup; storing the result of the determination in memory; determining whether the acquisition of disc information concerning recording should be performed during the spinup or after the completion of the spinup according to the result of the determination read from the memory; and if it is determined in the preceding step that the acquisition should be performed during the spinup, performing by the host computer the acquisition of the disc information required for recording on the optical disc during the spinup;

wherein the optical disc recording/reproducing apparatus returns the disc information to the host computer without performing the acquisition of the disc information after the completion of the spinup for the optical disc onto which data is likely to be written.

This configuration can reduce the time required for the host computer to recognize a loaded recordable optical disc.

An optical disc recording/reproducing method set forth in claim 3 of the present invention is characterized in that: the step of determining whether or not the command has been issued from the host computer in an early stage after the completion of the spinup according to claim 2 measures the time period between the completion of the spinup and the issuance of a command returning information concerning recording and, if the measured time period is less than of equal to a predetermined threshold, determines that the command is issued from the host computer in an early stage after the completion of the spinup.

This configuration allows disc recognition timing, which differs from one host computer environment to another, to be identified.

An optical disc recording/reproducing method set forth in claim 4 of the present invention is characterized in that the step of storing the result of the determination in the memory according to claim 2 or 3 initializes the memory upon powering on the host computer or resetting the hardware of the host computer, and sets stored values for a period from the completion of the spinup on the first load of an optical disc to the issuance of the command for returning information concerning recording.

This configuration allows disc recognition timing can be changed according to changes of the host computer environment.

An optical disc recording/reproducing method set forth in claim 5 of the present invention is characterized in that: the acquisition of information required for reproduction and the acquisition of information required for recording according to claim 1 or 2 are performed in conjunction with each other in the same process during the spinup.

This configuration can reduce the time required for the host computer to recognize a loaded recordable optical disc.

An optical disc recording/reproducing method set forth in claim 6 of the present invention is characterized in that: wherein when the acquisition of information concerning recording is performed during a spinup according to claim 1 or 2, the count of error retries for acquiring information required for reproduction and the count of error retries for acquiring information required for recording are provided separately and the count of error retries for acquiring information required for recording is set to a value less than that of the count of error retries for acquiring information required for reproduction; and if the count of error retries for acquiring information concerning recording is exceeded, the acquisition of the information concerning recording during the spinup is suspended and the remaining spinup is continued and the information concerning recording is acquired before a response to the command for returning the information concerning recording.

This configuration can decrease the probability of occurrence of timeout errors due to failure of acquiring information concerning recording during a spinup.

An optical disc recording/reproducing method set forth in claim 7 of the present invention is characterized in that: for using writing software to perform recording and reproduction in an optical disc recording/reproducing apparatus connected to a host computer according to instructions from the host computer, wherein, track information recorded in an extended recording area of an optical disc loaded on the optical disc recording/reproducing apparatus, TOC information for the first session from among pieces of TOC information that are index information of reproducible tracks, and information concerning the final closed session are acquired during a spinup;

it is determined from the acquired TOC information for the first session whether or not the second session is void, and if it is determined that the second session is void, the acquisition of the track information in the extended recording area of the optical disc and information concerning recording are not performed during the spinup.

According to this configuration, if it is determined from the first-session TOC information obtained in advance that the second session is void, the acquisition of information in a PMA and other information concerning recording is not performed during the spinup, thereby reducing the spinup time.

An optical disc recording/reproducing method set forth in claim 8 of the present invention is characterized in that: it is determined whether or not the loaded optical disc is recordable according to claim 1 or 2, and if the determination is positive, the acquisition of information concerning recording and information concerning reproduction are performed in CAV mode to reduce the seek time compared with the seek time in CLV mode and reduce the time required for the host computer to recognize the disc.

According to this configuration, the time required for the host computer to recognize the optical disc can be reduced because, for acquiring information concerning recording and reproducing information that involve access to an inner area and outer area of the optical disc, CAV mode is used in which acceleration or reduction of the speed of the spindle motor does not take place.

An optical disc recording/reproducing apparatus set forth in claim 9 of the present invention is connected to a host computer for using writing software to perform recording and reproduction according to instructions from the host computer, characterized by comprising storage means for storing all of, one of, or a combination of a plurality of the optical disc recording/reproducing method according to claims 1 to 8 as a program; and control means for performing the program stored in the storage means.

BEST MODE FOR CARRYING OUT THE INVENTION

An optical disc recording/reproducing method according to the present invention will be described with respect to embodiments of the present invention.

First Embodiment

FIGS. 1 to 4 show a first embodiment of the present invention.

Figure 2:
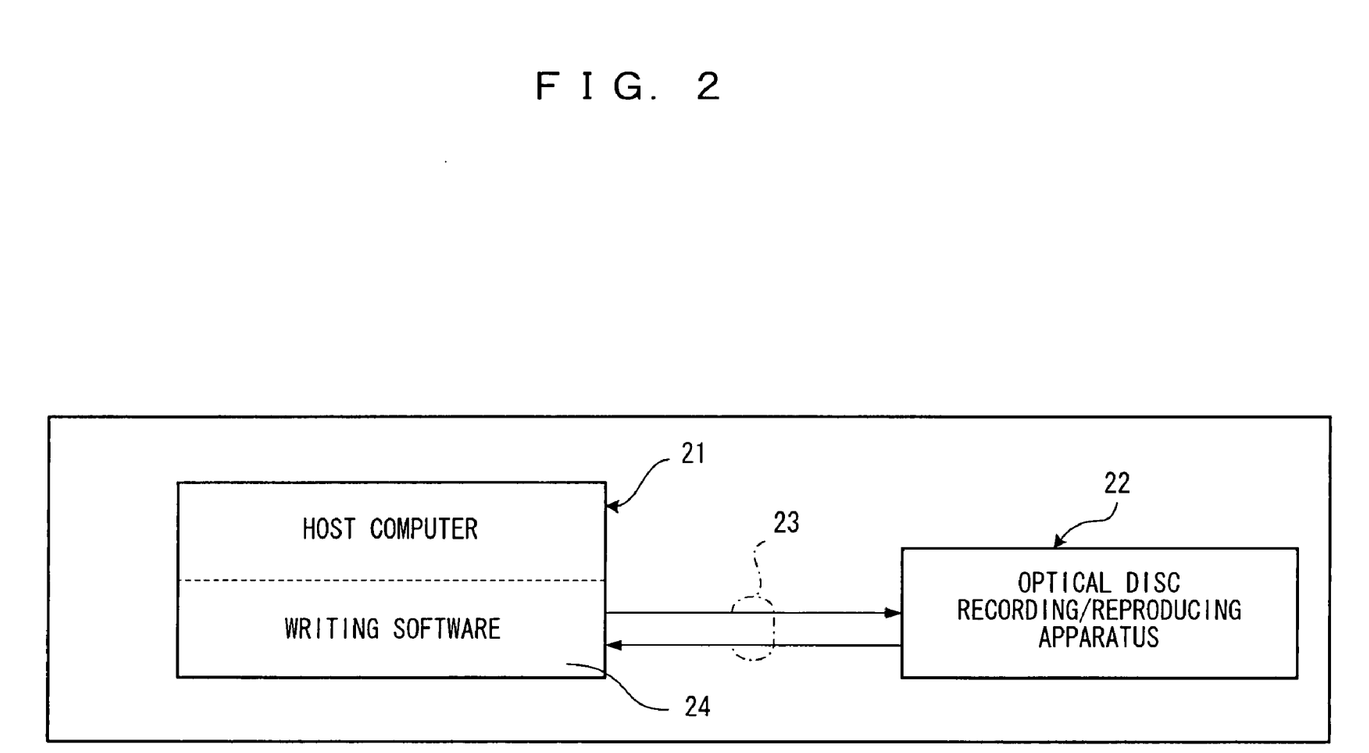
FIG. 2 is a diagram of a system configuration according to the embodiment.

FIG. 2 shows an optical disc recording/reproducing apparatus 22 using an optical disc recording/reproducing method of the present invention, which is connected to a host computer 21 through an interface cable 23 for recording/reproducing data through the use of writing software 24 installed in the host computer 21. The host computer 21 running the writing software 24 issues commands to the optical disc recording/reproducing apparatus 22.

Figure 1:
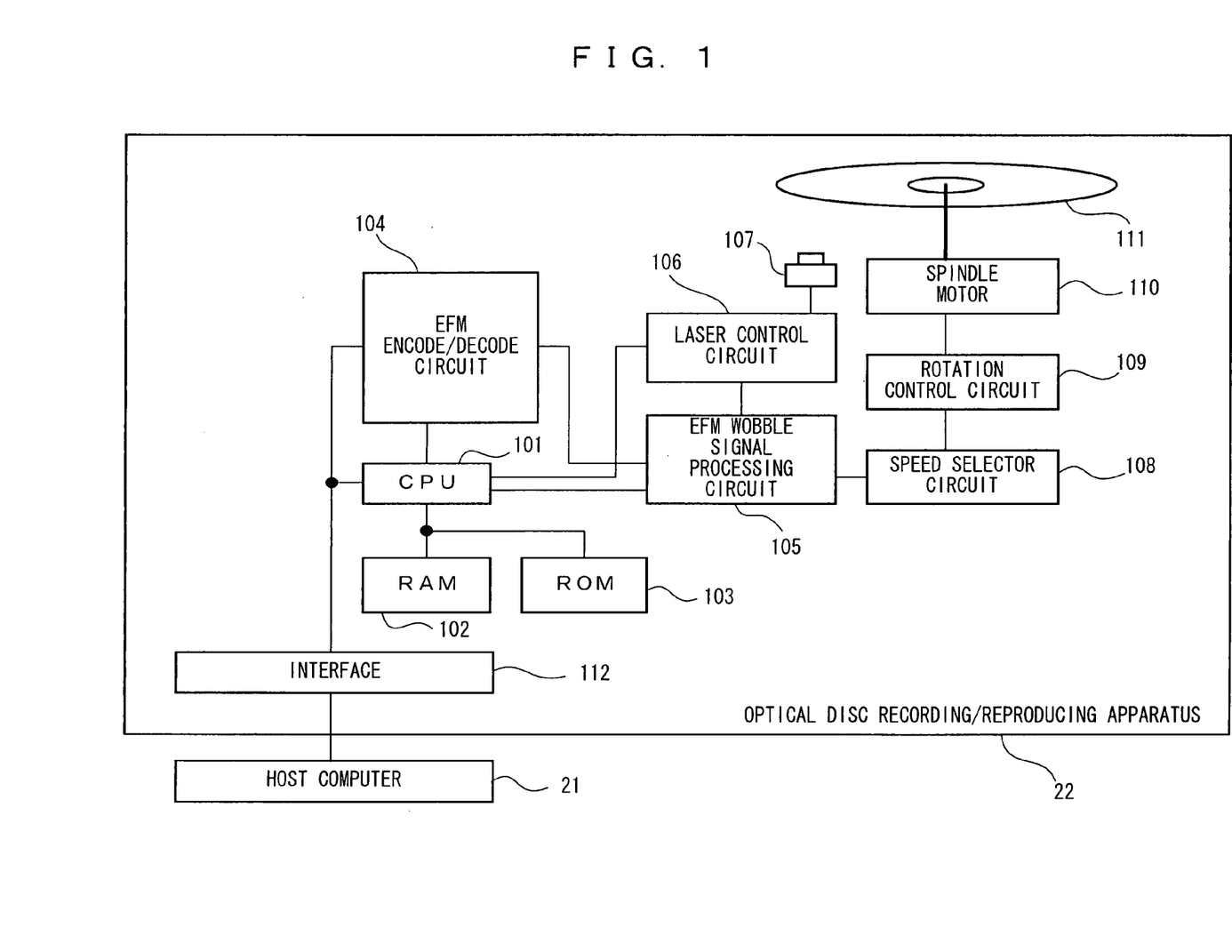
FIG. 1 is a block diagram of an optical disc recording/reproducing apparatus that implements an optical disc recording/reproducing method according to the first embodiment of the present invention.

The optical disc recording/reproducing apparatus 22 is configured as shown in FIG. 1 and comprises a CPU 101, a RAM 102, a ROM 103, an EFM encode/decode circuit 104, an EFM wobble signal processing circuit 105, a laser control circuit 106, a laser pickup 107, a speed selector circuit 108, a rotation control circuit 109, a spindle motor 110, and an interface 112.

Figure 4:
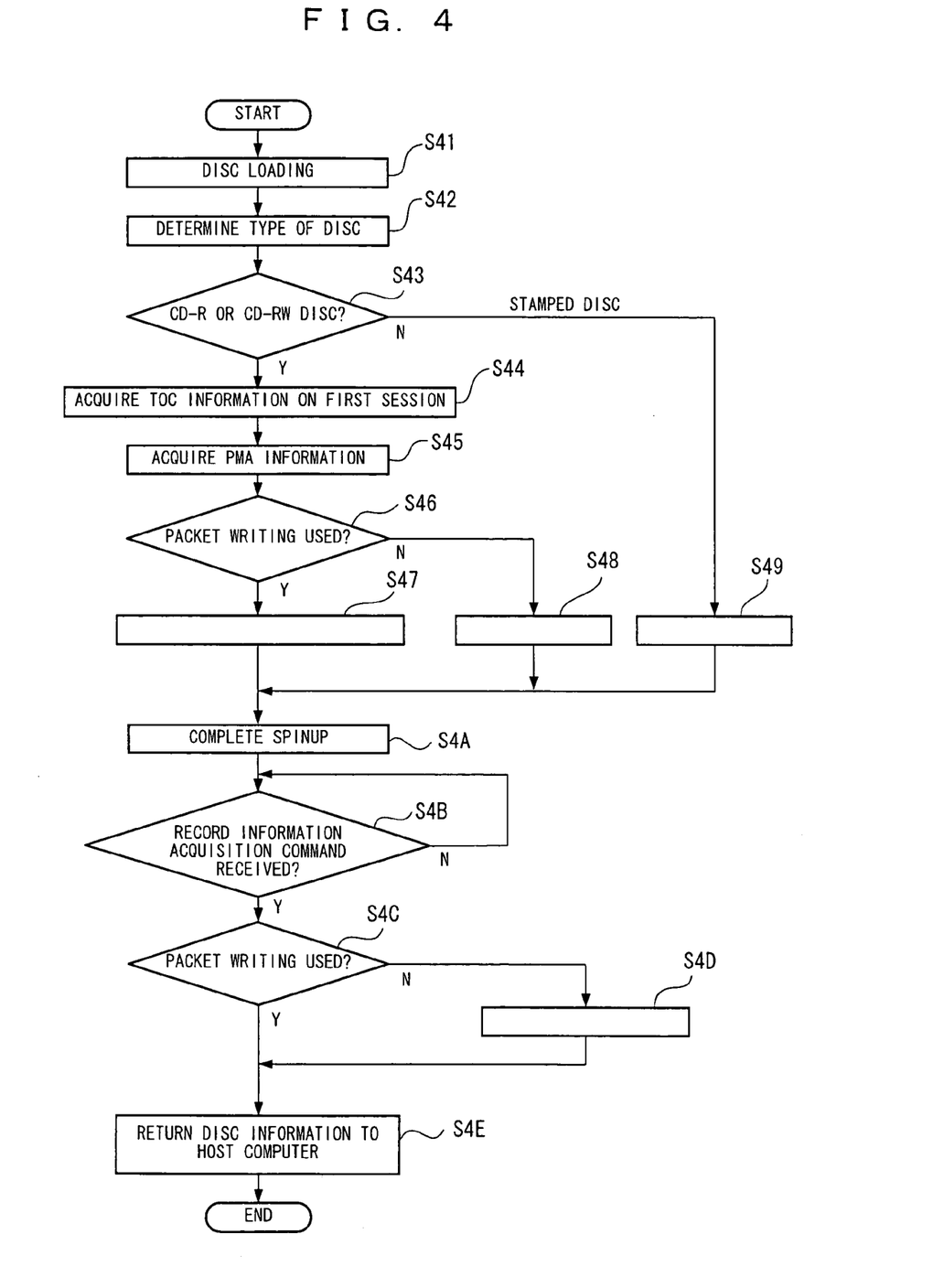
FIG. 4 is a flowchart showing the embodiment.

The optical disc recording/reproducing apparatus 22 is arranged so that the CPU 101 operates as shown in a flowchart in FIG. 4.

When an optical disc 111 is loaded in the optical disc recording/reproduction apparatus 22, the CPU 101 instructs the rotation control circuit 109 to drive the spindle motor 110 at step S41.

At step 42, it is determined whether the loaded optical disc is a CD-R/CD-RW disc, or a stamped disc. CD-R/CD-RW discs contain wobble information, which is specific to them. The determination as to whether the disc is a CD-R/CD-RW disc or a stamped disc is made on the basis of whether or not wobble information specific to CD-R/CD-RW can be read through the EFM wobble signal processing circuit 105.

If it is determined at step S43 that the disc is a CD-R/CD-RW disc, step S44 is performed.

Figure 3:
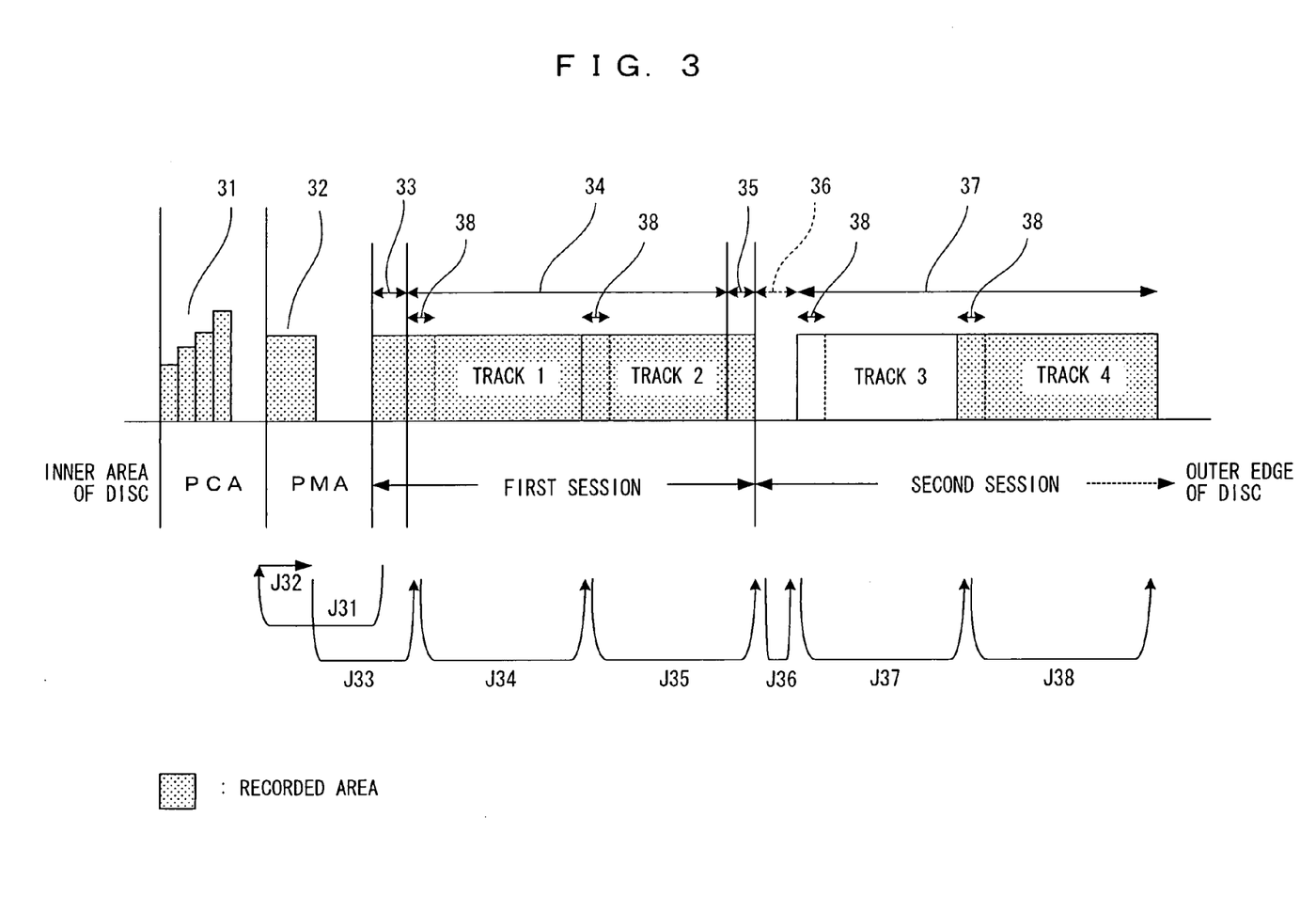
FIG. 3 is a diagram for illustrating an operation for acquiring information about an optical disc onto which data is recorded through the use of Packet-Writing-based writing software according to the embodiment.

FIG. 3 shows an exemplary operation according to the present invention for acquiring information about an optical disc on which data is recorded with packet-writing-based writing software 24. On the left-hand side of FIG. 3 is areas near the center. Reference number 31 indicates a PCA (Power Calibration Area), in which test data is written and read to find an optimum power according to certain evaluation criteria.

Reference number 32 indicates a PMA (Program Memory Area) which is an extended recording area on the disc, in which the track numbers and start and end points of the tracks are contained. Outside of the PMA 32 is a program area.

At step S44 in FIG. 4, the CPU 101 seeks to a read-in area 33 of the first session and acquires TOC information. At step S45, the CPU 101 seeks to the start position of the PMA 32, traces recorded PMA regions to acquire information about the recording type of recorded tracks, starting and end times.

At step S46, the CPU 101 determines on the basis of the recording mode information acquired at step S45 whether or not the packet writing has been used on the disc. If so, the CPU 101 considers that there is a high possibility that data will be recorded on the disc and proceeds to step S47.

At step S47, information required for reproduction operation and information required for recording operation are acquired in conjunction with each other during a spinup process. That is, all remaining information, including information about recording, is acquired by searching through a close range in the direction from the inner area to the outer edge of the disc. The information to be acquired for reproduction includes all information required for the address translation mode (method 2) within a closed session and the final closed session information. The information to be acquired for recording includes method 2 information within an open session and track information within the open session.

The information acquired at step S47 is listed below.

The following information is acquired by searching a close distance in the direction from the inner area to the outer edge of the disc:

Information required for reproduction
Method 2 information in a closed session
Final closed session information
Information required for recording
Track record information in a closed session
Method 2 information in an open session
Track record information in the open session On the other hand, if it is determined at step S46 that the packet writing method has not been used, then it is determined that the data is less likely to be written, and step S48 is executed.

At step S48, method 2 conversion information in a closed session and information indicating the final closed session is acquired to acquire information required for reproducing operation.

If it is determined at step S43 that the disc is not a CD-R/CD-RW disc, it is determined that a stamped disc is containing no information about recording and the process proceeds to step S49.

The information acquired at step S48 is listed below.

The following information is acquired by searching a close distance in the direction from the inner area to the outer edge of the disc:

Information required for reproduction
Method 2 information in a closed session
Final closed session information At step S49, TOC information recorded in the read-in area 33 of each session is searched for to acquire the TOC information required for reproduction operation only and method 2 conversion information for each session.

The operations performed at step S49 are listed below.

For each of the sessions until the nth session is reached,
(1) TOC information is searched for,
(2) the TOC information is acquired, and
(3) method 2 information is acquired.

After the completion of any of the steps S47, S48, and S49, the spinup operation is completed and the spinup completion is reported to the host computer 21 at step S4A.

Then, the CPU 101 waits until an information acquisition command required for recording is issued from the host computer 21 at step S4B. Typical information acquisition commands required for recording are a read disc information command, which returns the recording state of an entire disc, and a read track information command, which returns the recording state of each individual track.

If it is determined at step S4B that an information acquisition command required for recording is issued from the host computer 21, step S4C is performed.

At step S4C, it is determined whether or not Packet Writing has been used. If Packet Writing has not been used, step S4D is performed.

At step S4D, all the remaining information about recording is acquired by searching a close distance in the direction from the inner area to the outer edge of the disc. If the disc is a stamped disc on which no data can be recorded, track record information in a closed session is acquired. If the disc is a CD-R/CD-RW disc, track record information in a closed session and track record information and method 2 conversion information in an open session are acquired.

The operations performed at step S4D are listed below.

The following information is acquired in a close range in the direction from the inner area to outer edge of the disc:
Track record information in a closed session,
Method 2 information in an open session
Track record information in the open session If it is determined at step S4C that Packet Writing has been used for the disc or after step S4D is completed, the process proceeds to step S4E.

At step S4E, recording information acquired and stored in the memory is sent back to the host computer 21, thereby completing the process concerning the disc recognition.

Referring back to FIG. 3, an exemplary operation for acquiring information about the disc on which data has been recorded by means of Packet-Writing-based writing software. Reference numbers 33, 34, and 35 indicate the read-in area, program area, and read-out area of the first session, respectively. The fist session is closed and has two recorded tracks recorded in it. Reference numbers 36 and 37 indicate the read-in area and program area of the second session. The second session is opened. Track 3 of the second session is reserved and blank. On track 4, additional data is being written and therefore its end position has not been determined yet.

The method 2 conversion information and track record information in the track closed session are recorded in a pre-gap 38 between track 1 and track 2 of the first session. The method 2 conversion information in an open session as well as track recording format information in the track record information are recorded in a pre-gap 38 between track 3 and track 4 of the second session. The additionally recorded information in the track record information can be acquired by searching through tracks 3 and 4 in the open session to identify the boundary between the recorded region and the blank region.

As described above, it is determined at step S43 whether or not data is recorded in the read-in area 33 of the first session. In the example in FIG. 3, the read-in area 33 is a "recorded area." Therefore, TOC information is acquired at step S44. Then at step S46, the CPU 101 seeks to the beginning of the PMA 32 (J31) and traces the recorded region in the PMA 32 (J32) to acquire a track record. At step S47, the remaining disc information, including information about additionally recorded data, is acquired. The CPU 101 seeks to the pre-gap 38 of track 1 in the closed session (J33) to acquire the method 2 conversion information and track 1 recording format information. Then, it seeks to the pre-gap 38 of the track 1 (J34) to acquire the method 2 conversion information and track 2 recording format information. It then seeks to a region 36, which would be the read-in area of the second session (J35), to determine whether information is recorded in the area. Because no data is recorded, the CPU 101 acquires the knowledge that the fist session is the final closed session. It then seeks to the pre-gap 38 of track 3 of the open session (J36) to determine whether information is recorded. Because no information is recorded, the CPU 101 determines that the entire track is blank and identifies the beginning of that track as the position at which additional data is to be recorded. It then seeks to the pre-gap 38 of the track 4 in the open session (J37) and acquires the recorded method 2 conversion information and track 4 recording format information. Then it searches track 4 from its beginning to the end of the disc for the end of the recorded region (J38) to acquire the knowledge of the position in track 4 at which additional information is to be recorded.

In the first embodiment, step S49 is performed in CAV (Constant Angular Velocity) mode and Steps S44 to S48 are performed in CLV (Constant Linear Velocity) mode.

In this way, for a disc onto which data is likely to be written, the disc information is sent back from the optical disc recording/reproducing apparatus 22 to the host computer 21 without performing the operation for acquiring disc information after the completion of the spinup. Thus, time required for the host computer 21 to recognize a recordable optical disc 111 loaded into the optical disc recording/reproducing apparatus 22 can be reduced.

Second Embodiment

Figure 5:
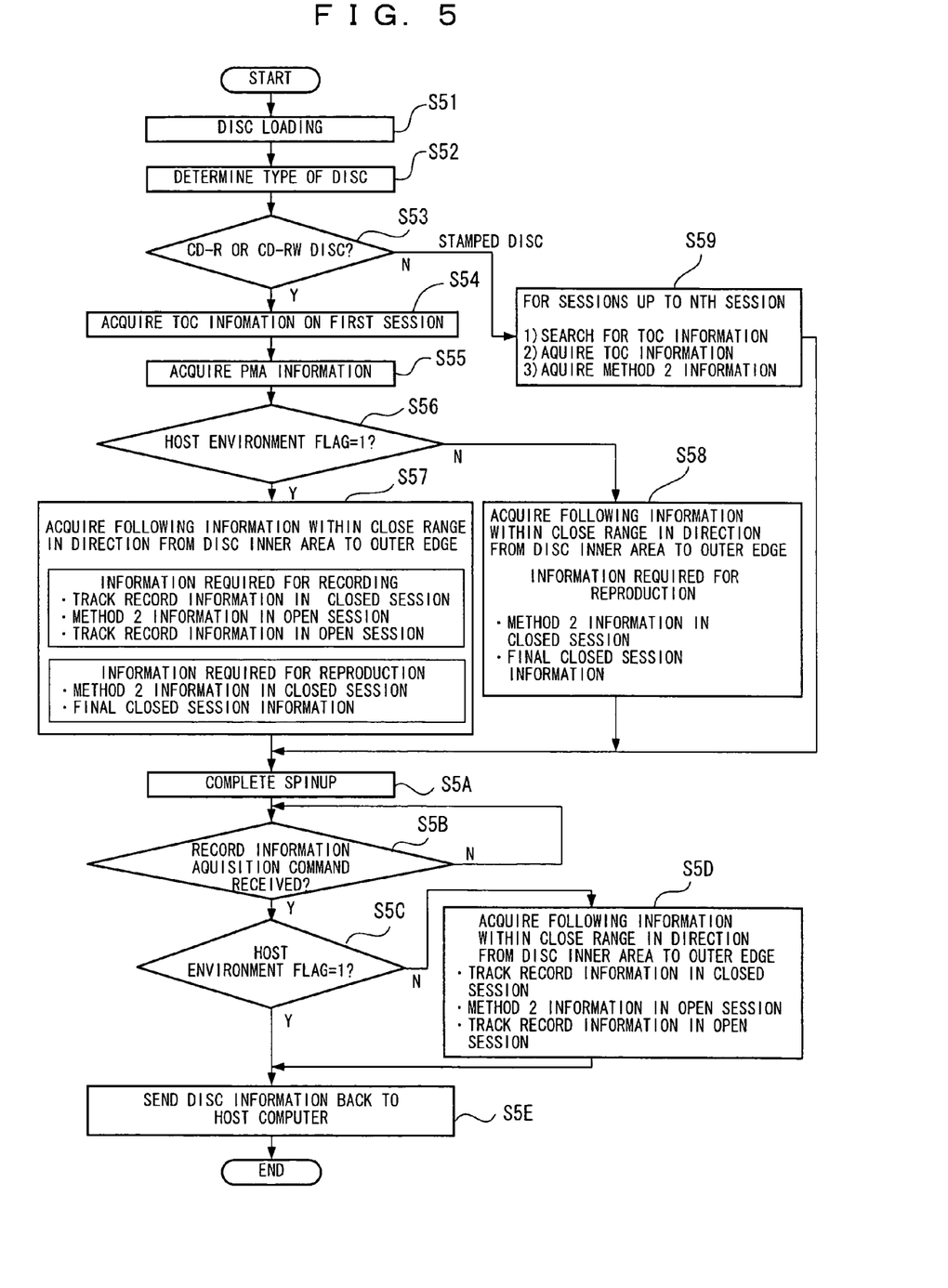
FIG. 5 is a flowchart showing a second embodiment of the present invention.
Figure 6:
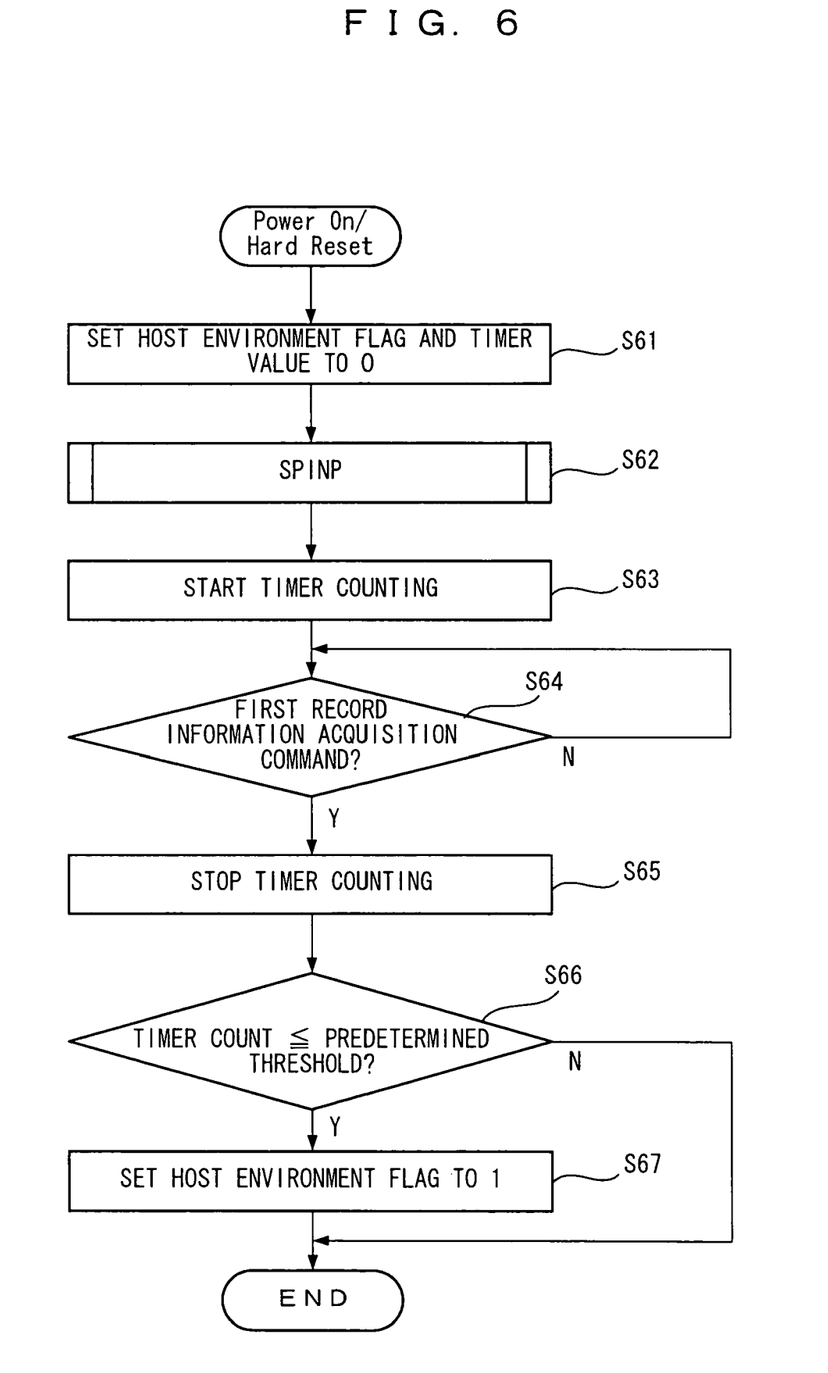
FIG. 6 is a flowchart of the initialization and setting of a host environment flag according to the second embodiment.

FIGS. 5 and 6 show flowcharts of operations performed in an optical disc recording/reproducing apparatus according to a second embodiment. The connection between the optical disc recording/reproducing apparatus and its host computer and the configuration of the optical disc recording/reproducing apparatus are the same as those shown in FIGS. 1 and 2. The only difference is that the CPU 101 operates as shown in the flowcharts in FIGS. 5 and 6. The operation will also be described with reference to the example shown in FIG. 3.

When an optical disc 111 is loaded into the optical disc recording/reproducing apparatus 22, the CPU 101 instructs a rotation control circuit 109 to drive a spindle motor 110 at step S51.

At step S52, it is determined whether the loaded disc is a CD-R/CD-RW disc, or a stamped disc. CD-R/CD-RW discs contain wobble information, which is specific to them. The determination as to whether the disc is a CD-R/CD-RW disc or a stamped disc is made on the basis of whether or not wobble information specific to CD-R/CD-RW can be read through the EFM wobble signal processing circuit 105.

If it is determined at step S53 that the disc is a CD-R/CD-RW disc, step S54 is performed. At step S54, the CPU 101 seeks to a read-in area 33 of the first session and acquires TOC information. At step S55, the CPU 101 seeks to the start position of the PMA 32, traces recorded PMA regions to acquire information about the recording type of recorded tracks, starting and end times.

Steps S51 to S55 described above are the same as steps S41 to S45 in the first embodiment shown in FIG. 4.

At step S56, a host environment flag value is checked to see whether or not the host environment is the one in which an information acquisition command for adding data to the disc at an early stage after the completion of spinup is issued. The host environment flag is set in the optical disc recording/reproducing apparatus 22 as described below.

FIG. 6 shows process steps for initializing and setting the host environment flag in a memory area for the host environment flag provided in RAM 102.

Upon the host computer 21 is powered on or upon the hard ware is reset, the CPU 101 initializes the host environment flag to "0" at step S61. It also initializes the timer to "0." Therefore, if the writing software operating environment of the host computer 21 is changed, the host environment flag value is updated, thereby allowing the setting of disc recognition timing to be changed according to a change in the environment of the host computer 21. The timer is subsequently used for measuring a time interval from the completion of spinup until a command for sending back information about recording is issued.

At step S62, spinup is performed. After the completion of the spinup, time-keeping by the timer, which has be reset at step S61, is started at step S63.

At step S64, the CPU 101 waits until a first command concerning recording is issued from the host computer 21. Then, the timer started at step S63 is stopped at step S65.

At step S66, the measured timer value is compared with a predetermined threshold (for example 10 to 20 seconds) to see if it is smaller than or equal to the threshold. If so, the host environment flag is set to "1" at step S67.

If it is determined at step S56 that the host environment flag, which can be set by performing the operation in the flowchart in FIG. 6, is set, and therefore it is determined that the host environment is the one in which an information acquisition command concerning recording is issued in an early stage after the completion of spinup, then the process proceeds to step S57 because another information acquisition command concerning recording will be issued in an early stage after the completion of a subsequent spinup.

At step S57, information required for reproduction operation and information required for recording operation are acquired in conjunction with each other during a spinup process. That is, all remaining information, including information about recording, is acquired by searching through a close range in the direction the inner area to the outer edge of the disc. The information to be acquired for reproduction include final closed session information, required for reproduction, in a closed session, method 2 conversion information and track record information in the closed session, and track record information and method 2 information in an open session.

The operations performed at step S57 are listed below.

The following information is acquired by searching a close distance in the direction from the inner area to the outer edge of the disc:

Information required for recording
Track record information in a closed session
Method 2 information in an open session
Track record information in the open session
Information required for reproduction
Method 2 information in a closed session
Final closed session information On the other hand, if it is determined at step S56 that the host environment flag value is "0" and therefore that no information acquisition command concerning additional recording is issued in an early stage after the completion of spinup in the host environment, then the process proceeds to step S58 because information concerning recording is not required immediately after the spinup.

At step S58 the method 2 conversion information in a closed session is acquired and the final closed session is located to acquire information required for reproduction.

If it is determined at step S53 that the disc is not a CD-R/CD-RW disc, the disc is considered as a stamped disc that contains no information about recording and the process proceeds to step S59.

The information acquired at step S58 is listed below.

The following information is acquired by searching a close distance in the direction from the inner area to the outer edge of the disc:

Information required for reproduction
Method 2 information in a closed session
Final closed session information At step S59, TOC information recorded in the read-in area 33 of each session is searched to acquire the TOC information and method 2 information required only for reproduction for each session.

The operations performed at step S59 are listed below.

For each of the sessions to the nth session,
1) TOC information is searched for,
2) the TOC information is acquired, and
3) method 2 information is acquired.

After the completion of any of steps S57, S58, and S59, then the spinup is complete at step S5A and the host computer 21 is notified of the completion of the spinup.

Then, at step S5B, the CPU 101 waits until an information acquisition command required for recording is issued by the host computer. Typical information acquisition commands required for recording include a read-disc-information command that returns the recording state of an entire disc and a read-track-information command that returns the recording state of each track.

If it is determined at step S5B that an information acquisition command required for recording is issued from the host computer 21, the process proceeds to step S5C.

At step S5C, the value of the host environment flag described above is determined. If it is determined that the host environment flag value is "0" indicating a command for acquiring information about recording is not issued in an early stage after the completion of spinup, the process proceeds to step S5D.

At step S5D, a close range is searched for in the direction from the inner area of the disc to the outer edge of the disc to acquire all the remaining information, including information about an additional record. If the disc is a stamp disc, which is not a recordable, then the CPU 101 acquires track record information. If the disc is a CD-R/CD-RW disc, then the CPU 101 acquires track record information from a closed session, track record information from an open session, and method 2 conversion information and information about the position in which data is additionally recorded from the open session.

The operations performed at step S5D are listed below:

The following information is acquired by searching a close distance in the direction from the inner area to the outer edge of the disc:

Track record information in a closed session
Method 2 information in an open session
Track record information in the open session.

If it is determined at step S5C that the host environment flag value is "1" indicating that an information acquisition command concerning additional recording is issued in an early stage after the completion of spinup in the host environment, or step S5D is completed, the process proceeds to step S5E.

At step S5E, recorded information acquired and stored in memory is returned to the host computer 21 and then the process concerning disc recognition ends.

In this way, for a disc onto which data is likely to be written, the disc information is sent back from the optical disc recording/reproducing apparatus 22 to the host computer 21 without performing the operation for acquiring disc information after the completion of the spinup. Thus, the time required for the host computer 21 to recognize a recordable optical disc 111 loaded into the optical disc recording/reproducing apparatus 22 can be reduced.

While the host environment flag is set in a RAM 102 used by the CPU 101 for its operation in the second embodiment, a separate non-volatile memory such as a flash memory is provided in the optical disc recording/reproducing apparatus 22 besides the RAM 102 and the host environment flag may be set in that non-volatile memory.

Third Embodiment

Figure 7:
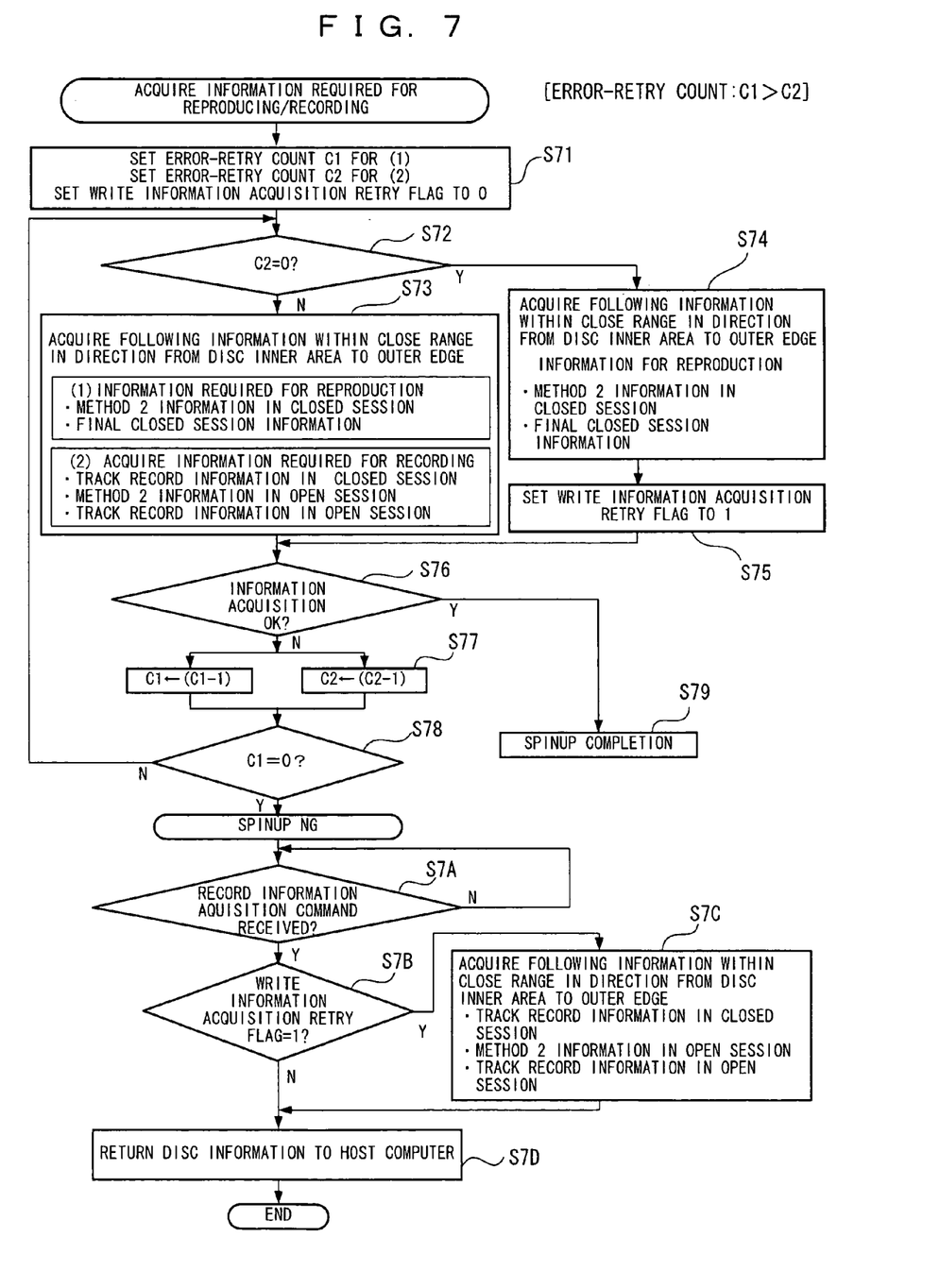
FIG. 7 is a flowchart of a process performed in the main elements of a third embodiment of the present invention.

FIG. 7 shows a flowchart of a process performed in the main elements of an optical disc recording/reproducing apparatus of a third embodiment of the present invention. The connection between the optical disc recording/reproducing apparatus and the host computer and the configuration of the optical disc recording/reproducing apparatus is the same as those indicated in FIGS. 1 and 2, the only difference is that the CPU 101 operates as shown in the flowchart in FIG. 7. The operation will be described with reference to the example shown in FIG. 3.

First, the relation between the flowchart in FIG. 7 and the first embodiment shown in FIG. 4 will be described, then the flowchart of the process in the optical disc recording/reproducing apparatus according to the third embodiment will be described.

When an optical disc 111 is loaded into the optical disc recording/reproducing apparatus 22, steps S41 to S46 shown in FIG. 4 or steps S41 to S43 and step S4A are performed depending on circumstances.

After step S46 is completed, step S71 is performed in the third embodiment, instead of step S47.

If it is determined at step S46 that packet writing has not been used, then the disc is considered that data is not unlikely to be written in the disc and step S48, step S4A and the subsequent steps are performed to return disc information to the host computer 21 at step S4E.

The flowchart in FIG. 7 will be described in detail below.

When the optical disc 111 is loaded into the optical disc recording/reproducing apparatus 22, the CPU 101 instructs a rotation control circuit 109 to drive a spindle motor 110. If it is determined that the loaded disc is an optical disc that is likely to be written, a close range is searched from the area near the inner area to the outer edge of the disc to acquire information about reproduction and information about recording in conjunction with each other in the same process during a spinup.

First, the CPU 101 initializes separately an error-retry count C1 for acquiring information required for reproduction and an error-retry count C2 for acquiring information required for recording. The CPU 101 also initializes a record information acquisition retry flag that indicates whether or not a retry to acquire information concerning recording that would have been acquired during spinup is performed in a period between the completion of the spinup and a response to a command concerning recording if the error-retry count is exceeded during the spinup.

At step S72, it is determined whether or not the error-retry count C2 for acquiring information concerning recording has reached 0. If not, (1) information 1 required for reproduction and (2) information required for writing are acquired at a time in step S73.

The operations performed at step S73 are listed below.

The following information is acquired by searching a close distance in the direction from the inner area to the outer edge of the disc:

Information required for reproduction
Method 2 information in a closed session
Final closed session information
Information required for recording
Track record information in the closed session
Method 2 information in an open session
Track record information in the open session At step S76, it is determined whether or not all information has been acquired. If an error occurs during acquiring information required for reproduction, the error-retry count C1 is decremented by 1 at step S77. If an error occurs during acquiring information required for recording, the error-retry count C2 is decremented by 1 at step S77.

At step S78, it is determined whether or not the error-retry count for acquiring information required for reproduction is 0. If it is 0, then a spinup error state is entered and the spinup error is reported to the host computer 21. Otherwise, the process returns to step S72 and a retry is made for acquiring the information.

If it is determined that the error retry for acquiring information concerning recording is 0, step S74 is performed.

Only information (1) required for reproduction is acquired at step S74, the record information acquisition retry flag is set to 1 at step S75, and step S76 described above is performed.

The operations performed at step S74 are listed below.

The following information is acquired by searching a close distance in the direction from the inner area to the outer edge of the disc:

Information required for reproduction
Method 2 information in a closed session
Final closed session information.

If it is determines at step S76 that the specified information has been acquired, the spinup is completed at step S79. Then, the process proceeds to step S7A to S7B. Then, record information stored in memory is returned to the host computer 21 at step S7D.

At step S7A, the CPU 101 waits until a command for acquiring information required for recording is issued by the host computer 21. Typical commands for acquiring information required for recording include a read-disc-information command that returns the recording state of an entire disc and a read-track-information command that returns recording state of each individual track.

When a command for acquiring information required for recording is issued by the host computer 21, step S7B is performed to determine whether or not the record information acquisition retry flag value is set to 1. If so, the process proceeds to step S7C to retry to acquire the information required for recording that has not been able to be acquired during the spinup.

The operations performed in step S7C are listed below.

The following information is acquired by searching a close distance in the direction from the inner area to the outer edge of the disc:

Track record information in a closed session
Method 2 information in an open session
Track record information in the open session On the other hand if it is determined at step S7B that the record information acquisition retry flag value is not 1, or after step S7C is completed, step S7D is performed to return disc information stored in memory to the host computer 21. Then the process concerning disc recognition ends.

The probability of occurrence of a timeout error due to failure to acquire information concerning recording during spinup can be decreased because: in order to acquire information concerning recording during a spinup operation, the error-retry count C1 for (1) an operation for acquiring information required for reproduction and the error-retry count C2 for (2) an operation for acquiring information required for recording are separately provided, the error-retry count C2 for acquiring the information concerning recording is set to a value smaller than that of the error-retry count C1 for acquiring the information required for reproduction, and, if the error-retry count C2 is exceeded, the operation for acquiring the information concerning recording during the spinup is suspended while the remaining spinup operation is being continued, and the operation for acquiring the information concerning the recording is performed at step S7C before step S7D where the information concerning the recording is returned in response to a command.

While the example has been described in which the process shown in the flowchart in FIG. 7 is applied to the first embodiment, the process can be applied to the second embodiment shown in FIG. 5 to provide the same advantages.

In particular, when an optical disc 111 is loaded into the optical disc recording/reproducing apparatus 22, steps S51 to S56 or steps S51 to S53 and step S59 shown in FIG. 5 are performed depending on circumstances.

After step S56, step S71 in FIG. 7 is performed instead of step S57.

If it is determined at step S56 that the host environment flag value is 0 indicating that a command for acquiring information concerning a write is not issued in an early state after the completion of spinup in the host environment, step S58, step S5A and the subsequent steps are performed and then disc information is returned to the host computer 21 at step S5E because it is not required that the information concerning the write be acquired immediately after the spinup.

Fourth Embodiment

Figure 8:
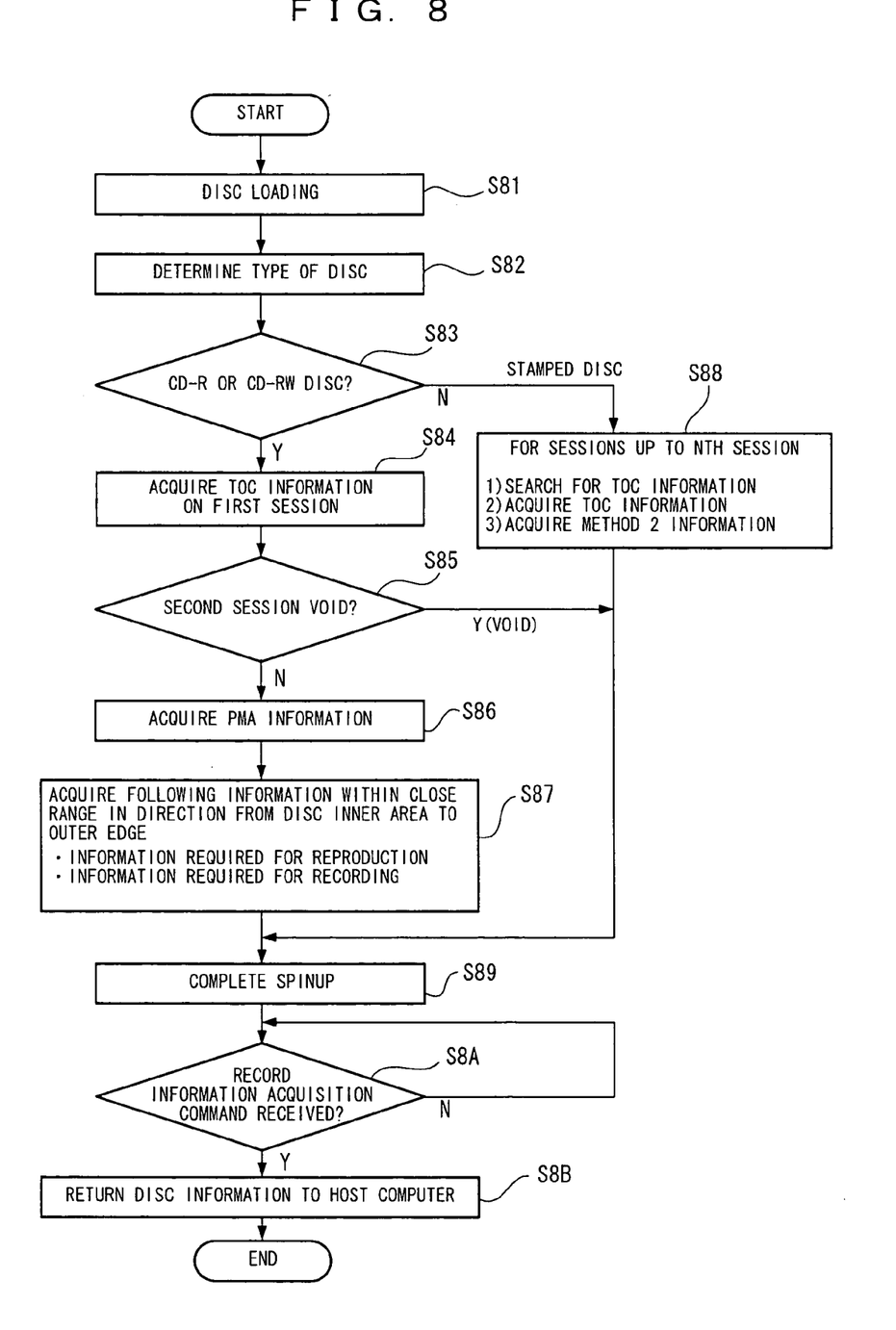
FIG. 8 is a flowchart of a process performed in the main elements of a fourth embodiment of the present invention.

FIG. 8 shows a flowchart of an operation performed in the main components of an optical disc recording/reproducing apparatus according to a fourth embodiment of the present invention. The connection between the optical disc recording/reproduction apparatus 22 and the host computer 21 and the configuration of the optical disc recording/reproduction apparatus 22 are the same as those shown in FIGS. 1 and 2. The only difference is that the CPU 101 operates as shown in the flowchart in FIG. 8. The operation will be described with respect to the example shown in FIG. 3.

When an optical disc 111 is loaded into the optical disc recording/reproducing apparatus 22, the CPU 101 instructs a rotation control circuit 109 to drive a spindle motor 110 at step S81.

At step S82, it is determined whether the loaded optical disc is a CD-R/CD-RW disc or a stamped disc. CD-R/CD-RW discs contain wobble information which is specific to them. The determination as to whether the disc is a CD-R/CD-RW disc or a stamped disc is made on the basis of whether or not wobble information specific to CD-R/CD-RW can be read through the EFM wobble signal processing circuit 105.

If it is determined at step S83 that the disc is a CD-R/CD-RW disc, then step S84 is performed to seek to the read-in area 33 of the first session to acquire TOC information.

At step S85, the TOC information acquired from the first session at step S84 is used to determine whether or not there is likely to be the second session. If it is determined that there is likely to be the second session, step S86 is performed.

At step S86, the CPU 101 seeks to the beginning of a PMA 32 and traces a recorded area of the PMA to acquire information about the recording type for recorded tracks and start and end times.

At step S87, information required for reproduction and information required for recording are acquired according to the recording state of the optical disc 111. The spinup operation is completed at step S89 and the completion of the spinup is reported to the host computer 21.

The operations performed in step S87 are listed below.

The following information is acquired by searching a close distance in the direction from the inner area to the outer edge of the disc:

Information required for reproduction,
Information required for recording.

On the other hand, if it is determined at step S85 that there is unlikely to be the second session, it is considered that there is not possibility of a write to the second and subsequent sessions. Therefore, steps S86 and S87 are skipped and step S89 is performed without acquiring further remaining PMA information and further information for reproduction and recording.

On the other hand, if it is determined at step S83 that the disc is not a CD-R/CD-RW disc, the disc is considered as a stamp disc having no information about recording, and TOC information recorded in the read-in area 33 of each session is searched for to acquire the TOC information and method 2 information for each session that are required for reproduction only, then step S89 is performed.

The operations performed in step S88 are listed below.

For each session to the n-th session,
1) TOC information is searched for,
2) the TOC information is acquired, and
3) method 2 information is acquired.

After the spinup is completed at step S89, the CPU 101 waits at step S8A until a record information acquisition command is issued by the host computer 21.

When it is determined at step S8A that a record information acquisition command is issued by the host computer 21, step S8B is performed.

At step S8B, disc information stored in memory is returned to the host computer 21, then the process for disc recognition ends.

In this way, if it is determined on the basis of the TOC information for the first session acquired from the loaded optical disc that the second session is void at step S84, the spinup time can be reduced because steps S86 and S87 are skipped and no further operation for acquiring information in the PMA and information about further writing are performed during the spinup.

Fifth Embodiment

While step S49 is performed in CAV mode and steps S44 to S48 are performed in CLV mode in the first embodiment shown in FIGS. 1 to 4, steps S44 to S48 and step S4D are performed in CAV mode, in which acceleration and speed reduction of the spindle motor 110 do not take place, in a fifth embodiment.

In particular, if it is determined at step S43 that the disc is not a CD-R or CD-RW disc, performance in CAV mode has been available since seek and information acquisition is executed based on address information in EFM information at step S4A.

On the other hand if it is determined at step S43 that the disc is a CD-R or CD-RW disc, a seek is performed between a recorded area and an unrecorded area according to address information in a wobble in order to acquire information at steps S44 to S48. In the past, wobble information was able to be decoded only in CLV mode in which the linear velocity is constant. In recent years, LSIs that have the capability of encoding in CAV recording, has enabled decoding wobble information in CAV mode. Therefore, operations from J31 to J38 at step S44 to S48 and the operation at step S4D can be performed in CAV mode in which the operation of the spindle motor is stable without acceleration or reduction, thereby reducing the seek time and therefore reducing the time required for the host computer to recognize the disc.

As can be seen from the foregoing description, according to the optical disc recording/reproducing method of the present invention, if a loaded disc is found to be a disc onto which data will probably be written, or if it is determined that a command for acquiring information concerning recording will be issued from the host computer in an early stage after the completion of spinup, the host computer environment is considered as one in which a loaded disc is likely to be recorded and disc information concerning recording must be acquired for recognizing the disc, and accordingly, acquisition of track record information and record position information required for recording is performed in conjunction with acquisition of information required for reproduction during spinup, thereby reducing the time required for the host computer to recognize the disc.

Furthermore, the number of error retries for acquiring information concerning recording during a spinup operation can be reduced and the spinup can be continued after the information acquisition is suspended due to an error to acquire the information concerning recording during a period of time between the completion of the spinup and the response to a command returning information concerning recording, thereby decreasing the probability of occurrence of timeout errors due to failure to acquire information concerning recording during the spinup.

Moreover, if it is determined that a loaded recording disc such as a CD-R/CD-RW is closed in one session, the acquisition of PMA information used for acquiring all TOC information on the multi-session and the acquisition of information concerning writing are not performed during spinup, thereby reducing the spinup time of that disc.

Furthermore, CAV mode in which the acceleration and reduction of the speed of the spindle motor do not occur is used for acquisition of information required for recording and reproduction that involves access to an inner area and an area near the outer edge of a disc, thereby reducing the time required for the host computer to recognize the disc.

The invention claimed is:

1. An optical disc recording/reproducing method for using writing software to perform recording and reproduction in an optical disc recording/reproducing apparatus connected to a host computer according to instructions from said host computer, comprising:
    determining whether an optical disc loaded in said optical disc recording/reproduction apparatus is an optical disc onto which data is to be written; and
    performing acquisition of disc information for recording onto said optical disc by said host computer during a spinup when it is determined that the disc is an optical disc onto which data is to be written, wherein said optical disc recording/reproducing apparatus returns the disc information to said host computer, wherein when the acquisition of information concerning recording is performed during the spinup, error retries for (1) acquiring information for reproduction are counted, and error retries for (2) acquiring information for recording are separately counted, and the count (A) of error retries for (2) acquiring information for recording is set to a value less than that of the count (B) of error retries for (1) acquiring information for reproduction, and if count (A) is exceeded, the acquisition of the information concerning recording during the spinup is suspended, the remaining spinup is continued, and the information concerning recording is acquired before a response to a command for returning the information concerning recording is provided.

2. The optical disc recording/reproducing method according, to claim 1, wherein the acquisition of information for reproduction and the acquisition of information required for recording are performed in conjunction with each other in the same process during the spinup.

3. The optical disc recording/reproducing method according to claim 1, wherein, it is determined whether the loaded optical disc is recordable, and if the determination is positive, the acquisition of information concerning recording and information concerning reproduction is performed in CAV mode to reduce the seek time compared with the seek time in CLV mode and reduces the time required for the host computer to recognize the disc.

4. An optical disc recording/reproducing method for using writing software to perform recording and reproduction in an optical disc recording/reproducing apparatus connected to a host computer according to instructions from said host computer, comprising:
    determining whether a command for said optical disc recording/reproducing apparatus to return information concerning recording to said host computer has been issued by said host computer after the completion of a spinup;
    storing the result of the determination in memory;
    determining whether the acquisition of disc information concerning recording should be performed during the spinup ;and
    performing by said host computer the acquisition of the disc information required for recording on said optical disc during the spinup , wherein said optical disc recording/reproducing apparatus returns the disc information to said host computer, and when the acquisition of information concerning recording is performed during the spinup, error retries for (1) acquiring information for reproduction are counted, and error retries for (2) acquiring information for recording are senarately counted, and the count (A) of error retries for (2) acquiring information for recording is set to a value less than that of the count (B) of error retries for (1) acquiring information for reproduction, and if count (A) is exceeded, the acquisition of the information concerning recording during the spinup is suspended, the remaining spinup is continued, and the information concerning recording is acquired before a response to a command for returning the information concerning recording is provided.

5. The optical disc recording/reproducing method according to claim 4, wherein determining whether the command has been issued by said host after the completion of the spinup measures the time period between the completion of the spinup and the issuance of a command returning information concerning recording and, if the measured time period is less than or equal to a predetermined threshold, determines that the command is issued from said host computer after the completion of the spinup.

6. The optical disc recording/reproducing method according to claim 4, wherein storing the result of the determination in the memory initializes said memory upon powering on said host computer or resetting a hardware thereof, and sets stored values within a period from the completion of the spinup on the first load of an optical disc after the initialization to the issuance of the command for returning information concerning recording.

* * * * *